United States Patent [19]
Craig

[11] Patent Number: 5,191,809
[45] Date of Patent: Mar. 9, 1993

[54] EXERCISE BICYCLE FLYWHEEL

[75] Inventor: Marion N. Craig, Calhoun, Ill.

[73] Assignee: Roadmaster Corporation, Olney, Ill.

[21] Appl. No.: 760,700

[22] Filed: Sep. 16, 1991

[51] Int. Cl.⁵ .................. G05G 1/00; F16F 15/22; F16F 15/10

[52] U.S. Cl. .................. 74/572; 74/573 R; 74/574; 482/62

[58] Field of Search .................. 74/572, 573 R, 574; 482/62, 63, 64, 59; 280/217

[56] References Cited

U.S. PATENT DOCUMENTS

| | | | |
|---|---|---|---|
| 1,230,205 | 6/1917 | Nichols | 74/574 |
| 1,235,153 | 7/1917 | Osaki | 74/572 |
| 1,451,818 | 4/1923 | Forster | 74/572 |
| 3,485,037 | 12/1969 | Clerk | 74/572 |
| 3,918,327 | 11/1975 | Christy | 74/571 |
| 4,020,937 | 5/1977 | Winter | 74/572 |
| 4,138,286 | 2/1979 | Chevrolat . | |
| 4,208,921 | 6/1980 | Keyes . | |
| 4,809,970 | 3/1989 | Beistegui | 482/64 |
| 4,902,001 | 2/1990 | Balbo | 482/62 |
| 4,932,649 | 6/1990 | Chen | 482/62 X |
| 4,977,794 | 12/1990 | Metcalf | 74/574 |
| 4,981,294 | 1/1991 | Dalebout et al. | 74/572 X |
| 5,000,444 | 3/1991 | Dalebout et al. | 482/59 |
| 5,048,824 | 9/1991 | Chen | 482/59 |

FOREIGN PATENT DOCUMENTS

| | | | |
|---|---|---|---|
| 704796 | 3/1965 | Canada | 74/574 |
| 2504831 | 7/1975 | Fed. Rep. of Germany | 74/572 |
| 58-20083 | 11/1983 | Japan | 74/572 |

*Primary Examiner*—Vinh T. Luong
*Attorney, Agent, or Firm*—Polster, Lieder, Woodruff & Lucchesi

[57] ABSTRACT

An exercise bicycle wheel comprises a pair of facing fly wheel halves. The flywheel halves include spokes which extend outwardly from a hub portion and terminate in concave rim portions which face one another. When the two halves are joined, the rim portions define a water tight cavity. This cavity is filled with a heavy material which is initially flowable and which sets in the cavity. Preferably the mixture includes hematite chips, magnetite powder, hydrated lime, portland cement, a water reducer, and water.

2 Claims, 3 Drawing Sheets

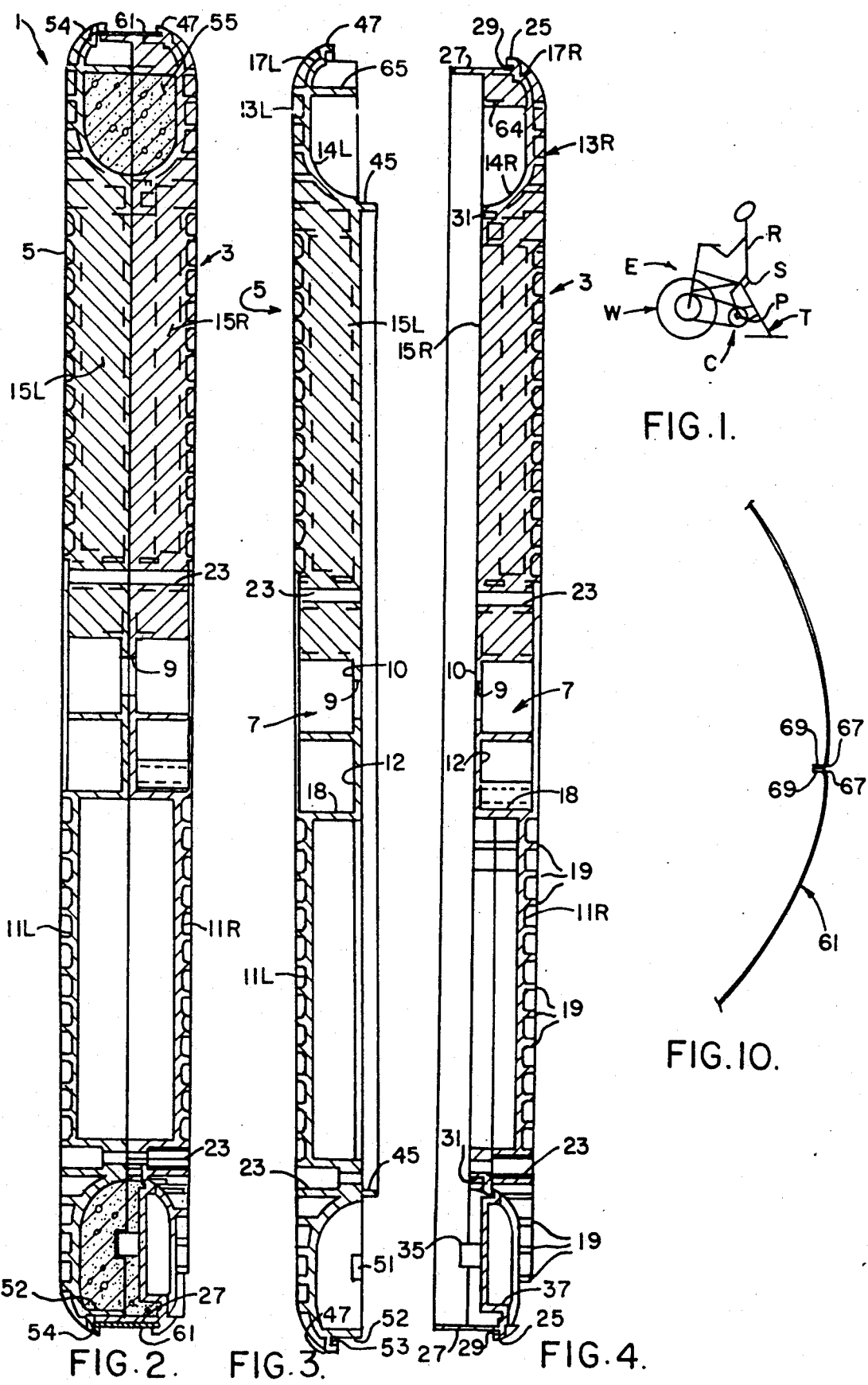

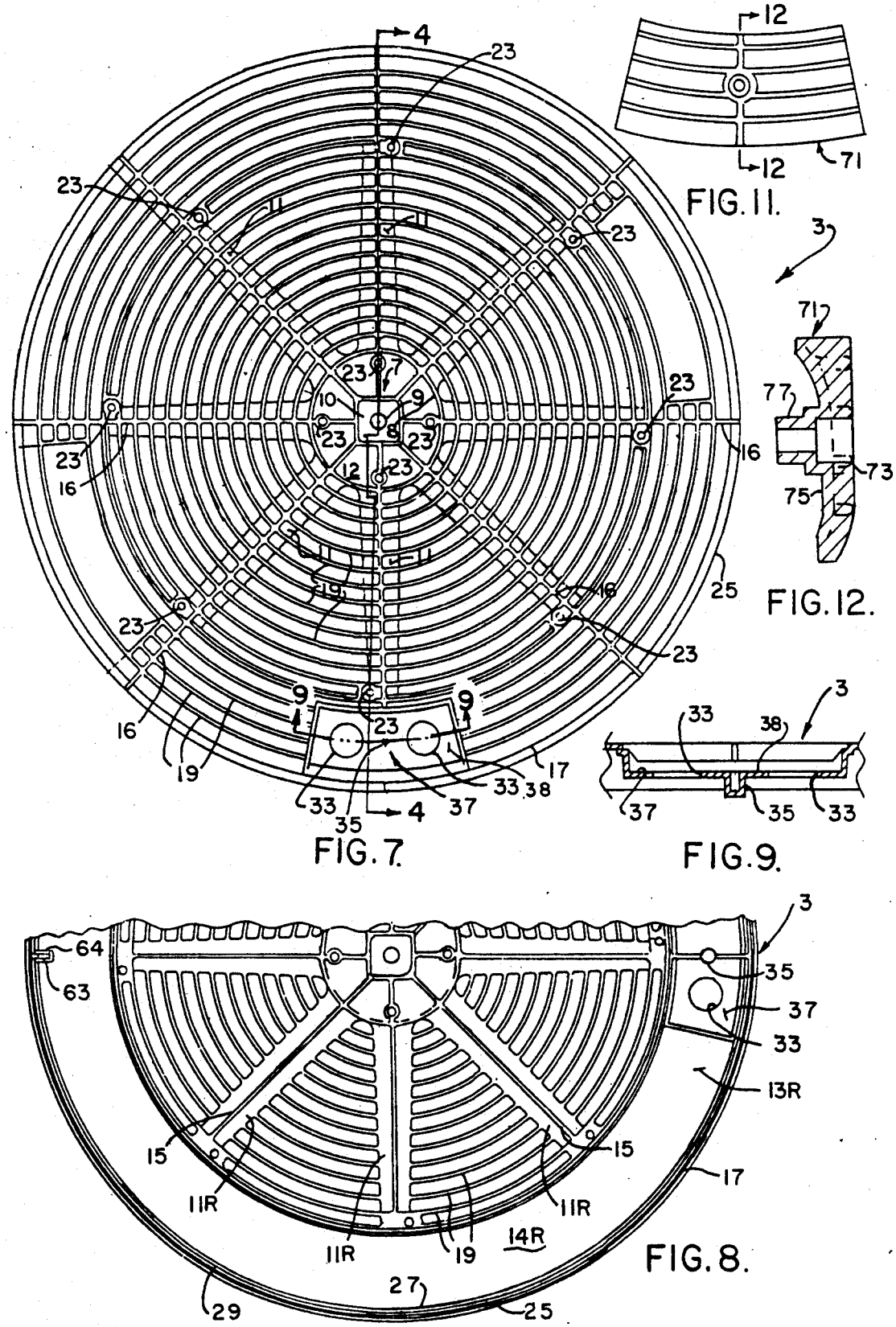

EXERCISE BICYCLE FLYWHEEL

BACKGROUND OF THE INVENTION

1. Field of Invention

This invention relates to exercise equipment, and in particular, to a weighted flywheel for use on exercise bicycles.

2. Description of the Prior Art

Exercise bicycles benefit the user by improving cardio-vascular fitness, enhancing body tone and engendering an overall sense of well being. Typically, the user exercises by pedaling a predetermined amount of time, or pedaling the equivalent of a distance indicated on an odometer. Also, the user may simulate pedaling up an incline by adjusting calipers or a tension belt on a wheel or the gear ratio between a sprocket and the wheel. Whichever mechanism is used, the effect is to increase the amount of work required by the user.

While many exercise bicycles use a wheel similar to that found on conventional bicycles, it is also advantageous to replace this type wheel with a flywheel. One function of a flywheel is to damp out any fluctuations which occur during a sequence of pedaling strokes by the user. For this purpose, the flywheel needs to have weight. It has been customary heretofore to use a cast iron flywheel, but these have not been made where the exercise bicycle is assembled, and they have been expensive to ship. Heavy steel shells have also been used, welded together radially inboardly of an outside rim, but they have been difficult to form and expensive because of their weight.

SUMMARY OF THE INVENTION

One of the objects of this invention is to provide an exercise bicycle flywheel that is less expensive to manufacture and assemble than such flywheels known heretofore.

Another object is to provide such a flywheel that is unaffected by heat generated by a brake or drag during use of the exercise bicycle.

Other objects and features will be apparent to those skilled in the art in the light of the following description and accompanying drawings.

In accordance with the invention, generally stated, there is provided an exercise bicycle flywheel. The flywheel includes a right half and a left half which are matingly connected. Each half includes a central hub portion having an opening therethrough for mounting the flywheel on an axle of an exercise bicycle. A plurality of spokes extend radially from the central hub portion to a rim portion which extends around the periphery of the flywheel. The rim portion of each half has a concave inner surface, such that the rim portions of each half define an annular cavity around the periphery of the flywheel when the right and left halves are joined. The cavity is filled with a flowable, settable material which preferably includes, in parts by dry weight, Hematite chips: 69%; Magnetite powder: 18%; Hydrated lime: 3%; and Portland cement: 10%. A water reducer in the amount of 10-25 oz. per pound of Portland cement is added. Water is added to the material as needed.

The cavity defining wall has an opening to the cavity through which the material is poured. A plug closes off the opening after the material is poured therein. The walls of the two halves are made so that the cavity will be water tight when the two halves are joined.

BRIEF DESCRIPTION OF THE DRAWINGS

FIG. 1 is a schematic representation of an exercise bicycle on which the present invention is used;

FIG. 2 is a cross-sectional view of a flywheel, the left half of which is taken along lines 3—3 of FIG. 5 and the right half of which is taken along the line 4—4 of FIG. 7;

FIG. 3 is a cross-sectional view of a left half of the flywheel taken along line 3—3 of FIG. 5;

FIG. 4 is a cross-sectional view of a right half of the flywheel taken along line 4—4 of FIG. 7;

FIG. 7 is a view in side elevation of the right half of the flywheel as shown in FIG. 5;

FIG. 8 is a fragmentary view in side elevation of the right half rotated 90° from the view of FIG. 6;

FIG. 9 is an enlarged cross-sectional view of a portion of the right half of the flywheel taken along line 9—9 of FIG. 7;

FIG. 10 is a fragmentary side elevational view of a band which circumferentially surrounds the flywheel;

FIG. 11 is an enlarged plan view of a cap of the flywheel; and

FIG. 12 is a cross-sectional view of the cap taken along line 12—12 of FIG. 11.

DESCRIPTION OF THE PREFERRED EMBODIMENT

Figure 5:
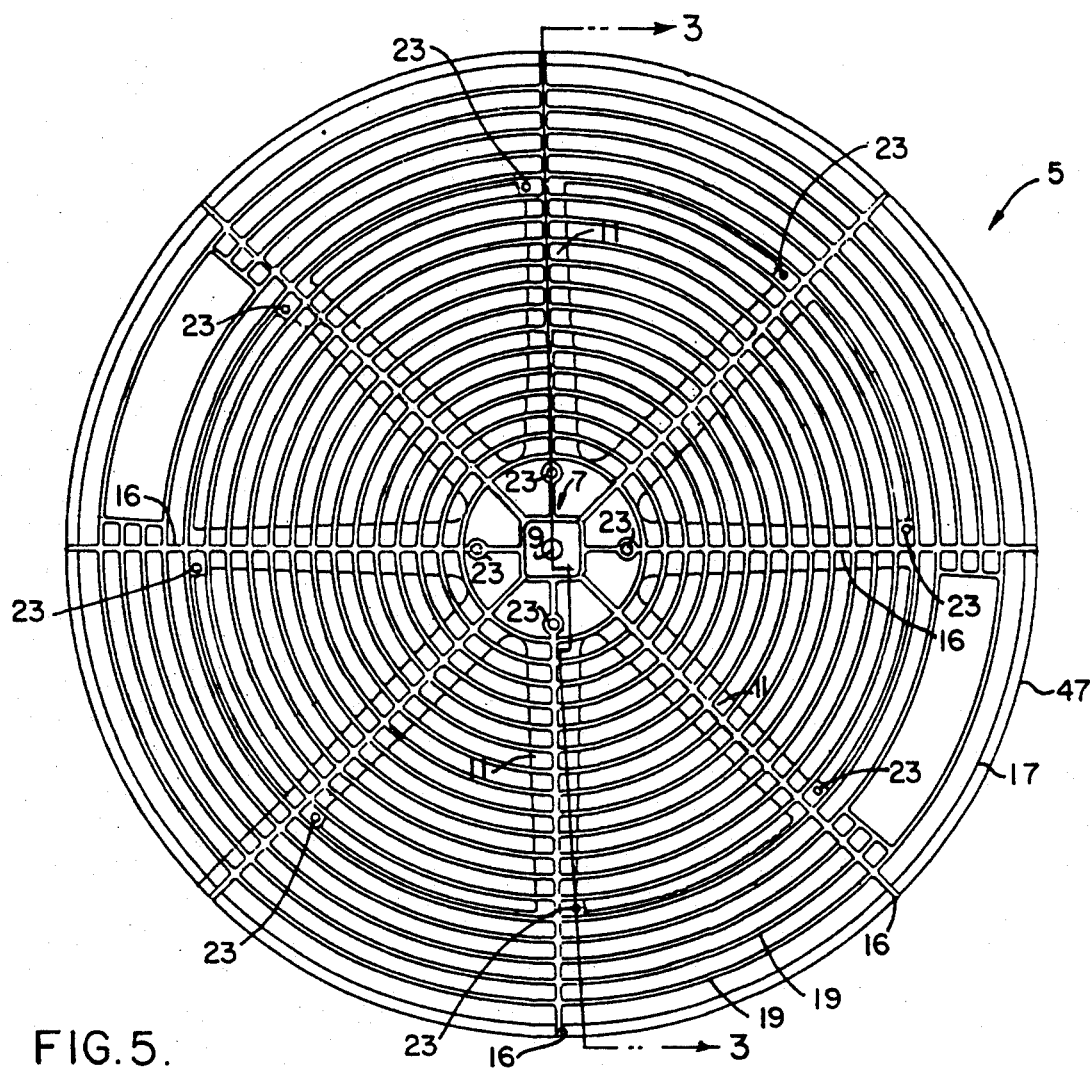
FIG. 5 is a view in side elevation, reduced in comparison with FIGS. 1–4 of the left half of the flywheel.

Referring now to FIG. 1, one illustrative embodiment of an exercise bicycle is generally denoted by the reference character E. Bicycle E commonly has only one wheel W and is supported by stand T. Wheel W is commonly driven by a rider R who pedals pedals P. Pedals P drive a chain and sprocket assembly C which, in turn, drives wheel W.

Figure 6:
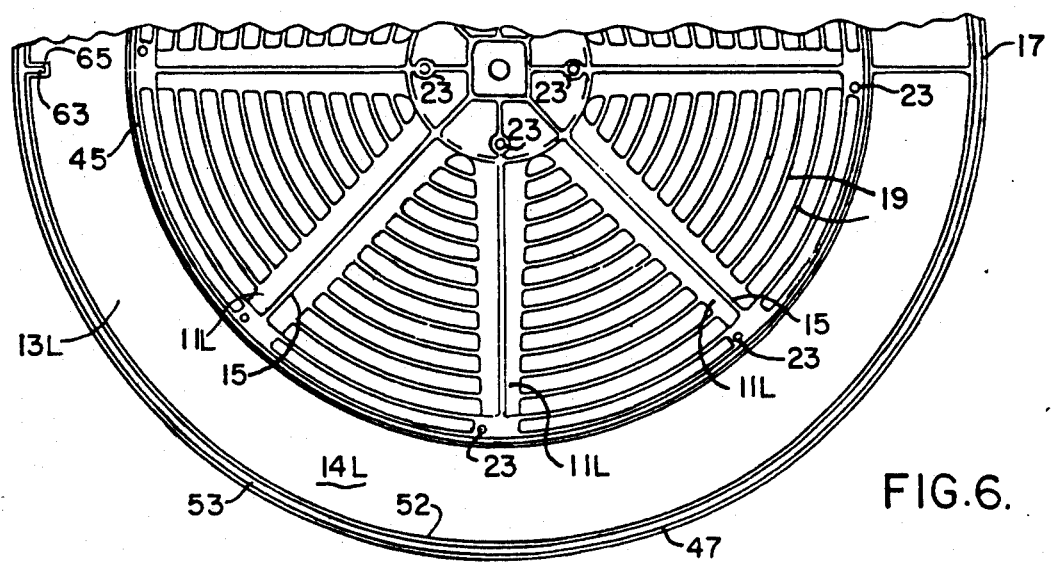
FIG. 6 is a fragmentary view in side elevation of the left flywheel half, reduced in comparison with FIGS. 1–4.

Wheel W of this invention is preferably the wheel 1 shown in FIGS. 2–8. As is shown, wheel 1 includes a right half 3 and a left half 5, each of which is made from a high impact polystyrene, such as is available under the name Huntsman 333, or its equivalent. Halves 3 and 5 are joined together as shown in FIG. 2. Each wheel half includes a central hub 7 having a web 10 defining a bearing passage 9. Passage 9 allows wheel 1 to be mounted on a drive shaft of bicycle E. (FIGS. 5 and 7). A web 12 surrounds hub 7 and has a circular wall 8 at it periphery. A series of flat spokes 11R and 11L extend radially outwardly from hub 7 of each half. There are preferably eight spokes which are evenly spaced around wall 8. As best seen in FIGS. 6 and 8, rim portions 13R and 13L extend around wheel 1 at the ends of spokes 11R and 11L, respectively. As shown in FIGS. 3 and 4, rims 13R and 13L have concave interior surfaces 14R and 14L, respectively. Radially extending vanes 15R and 15L extend along the interior of the spokes 11R and 11L from hub 7 to the inner edge of rims 13R and 13L. Vanes 15R and 15L are narrower than spokes 11R and 11L and extend generally perpendicularly inwardly from spokes 11R and 11L. Vanes 15R, 15L have a height equal to the depth of rims 13R and 13L. Radially extending ribs 16 extend along the exterior of the spokes to the periphery 17 of rims 13R and 13L. Concentric ribs 19 extend between radial ribs 16 on each half of the fly wheel. Concentric ribs 19 are evenly spaced from wall 8 to the periphery 17. Passages 23 are positioned around hub 7 and the inner edge of the rims to receive fasteners to aid in connecting the right and left halves of wheel 1.

Turning to FIGS. 4 and 7-9, right half 3 includes an annular L-shaped lip 25 which extends around its periphery 17. An annular wall 27 extends inwardly from the base of lip 25 and forms a notch 29 therewith. Wall 27 is longer than vane 15R. An annular groove 31 is formed in an interior surface of right half 3 radially inward of rim 13R. A pair of openings 33 are formed in the web 38 defining the bottom of rim 13R. A hollow peg 35 is between openings 33. Holes 33 are formed in a generally arched rectangular indentation 37. (FIGS. 7 and 9).

Turning to FIGS. 3 and 5-6, it will be seen that in the space radially inwardly of the rim portions, left half 5 is nearly a mirror image of right half 3. However, rather than having a groove 31, left half 5 has an annular lip 45 radially inboard of rim 13L. An outer L-shaped lip 47 is formed at the periphery of rim 13L. A blind hole 51 is formed in the portion of the rim 13L which is opposite peg 35 in right half rim 13R. An annular wall 52 extends around the periphery of rim 13L. Wall 52 and L-shaped lip 47 define an annular seat 53 as seen at the bottom of FIG. 3.

As seen in FIG. 2, when the two halves are brought together, right half wall 27 seats between left half lip 47 and left half wall 52 and annular lip 45 is received in annular groove 31. At the bottom of the wheel 1, as viewed in FIG. 2, peg 35 is received in hole 51 and wall 27 is received in seat 53. Wall 27 defines an annular seat 54 with lip 47.

As can be seen, the interior surfaces of the rim portions 13 form an annular cavity 55 which extends around wheel 1. Openings 33 allow for access to cavity 55. The interaction of wall 52 and lip 45 with wall 27 and groove 31 is such that cavity 55 is water tight.

A band 61 is placed on wall 25 around the periphery 17 of the wheel 1. Band 61 is provided to protect flywheel 1 from a braking strap which is used to increase or decrease the resistance a rider feels when the exercise bicycle is used. Band 61 is surfaced with polished chrome which will allow flywheel I to rotate smoothly as the braking strap is tightened to increase the frictional resistance to turning of the flywheel. Band 61 fits in seats 29 and 54 which are defined by lips 25 and 47 and wall 27. A blind slit 63 is defined by walls 64 in right half 3 and 65 in left half 5. Walls 64 and 65 are integral with walls 52 and 27, respectively. (FIGS. 6 and 8). Band 61 is not a continuous circle. Rather, it has ends 67 each of which has a finger 69. Fingers 69 are received in slit 63 to hold band 61 in place on wheel 1 against circumferential movement.

When the two halves are fitted together, the cavity 55 is filled with a heavy material. The material is a material which is initially flowable, but will set. One illustrative form of heavy material which has been found to be eminently satisfactory and that constitutes the preferred embodiment of the material, is made of, in parts by dry weight:

Hematite chips: 69
Magnetite powder: 18
Hydrated lime: 3
Portland cement: 10

A water reducer in added to this composition in the amount of 10-25 oz. per 100 lbs. of cement. Water is added as needed.

The function of the magnetite powder is chiefly to increase the density and to float the hematite chips which are the principal ingredient. The important function of floating the hematite chips can be performed by other heavy, finely powdered minerals, but magnetite is available and effective. The hydrated lime is used as a plasticizer to improve flowability. It also acts to prevent water separation during the curing or setting phase. The Portland cement is a binder. The water reducer (a super plasticizer) reduces the amount of water needed to produce a free-flowing mixture. The material may easily be poured through openings 33, which may be on the order of 0.75" in diameter, for example. After filling, a plug 71 is inserted through the openings to seal the material inside the flywheel, and the material is allowed to set.

As seen in FIGS. 11 and 12, plug 71 conforms to the shape of indentation 37. Plug 71 is placed in indentation 37 to close openings 33 after the above described material is poured into cavity 55. Plug 71 includes a generally planar upper surface 73 and a curved inner surface 75. Surface 75 generally conforms to the contour of rim surface 14R. A column 77 extends inwardly from the center of inner surface 75. Column 77 is received in hollow peg 35 to secure plug 71 in indentation 37.

To assemble the flywheel 1, right half 3 is initially placed on the bicycle drive shaft. Band 61 is then placed on wall 27 and fitted into notch 29 with its arms 69 in notch 63 of wall 27. Left half 5 is then installed on the shaft and rotated so that screw holes 23 and slit 63 line up. Bore 51 is aligned with peg 35. The left half is then moved axially until it engages the right half. Lip 47 covers a left marginal portion of band 61, as seen in FIG. 2. Screws are then passed through the screw holes 23 to hold the two halves together. The interaction of annular lip 45 with groove 31 and of the exterior walls of the lip portion creates a water tight seal. The filling material is poured through openings 33 in right half 3 to fill cavity 55. The material is added to give weight to the flywheel 1, which is preferably made of a plastic, such as high impact polystyrene or its equivalent. Plug 71 is then inserted into indentation 37 to close holes 33 and the material is allowed to set.

The flywheel can be painted or chrome plated and, if desired, can be given the same appearance as conventional cast iron flywheels.

Numerous variations in the construction of the flywheel of this invention, within the scope of the appended claims, will occur to those skilled in the art in the light of the foregoing disclosure. Merely by way of example, the configuration of the flywheel can be changed, and the particular ways in which the parts are secured to one another can be changed. Although the provision of spokes and cored ribs provides a light wheel between the hub and the rim, which is highly desirable, other configurations of web between the hub and rim can be used. The two halves can be made of other lightweight plastics or metals. Aluminum, for example, could be used. It can be made of different gauge metals, preferably the lightest gauge that will not distort, that can accommodate the drag or brake system and that can be secured to the drive shaft, the filler serving to maintain the form of the wheel in those areas in which the filler is in place and set. The filler material can be composed differently from the preferred embodiment of the material, or the same materials can be differently treated, as by grinding the hematite, for example, as long as the filler is heavy enough, settable, and, like the shells of the wheel, unaffected by the amount of heat generated by the brake or drag mechanism in use. These examples are merely illustrative.

Having thus described the invention, what is claimed and desired to be secured by Letters Patent is:

1. An exercise bicycle flywheel comprising a right half and a left half which are matingly connected; each said half including a central hub and a rim portion extending around the periphery of said flywheel, said rim portion having a concave inner surface;

said rim portions of said right and left halves defining an annular cavity around the periphery of said flywheel when said right and left halves are joined; said cavity being filled with a heavy, flowable, settable material; and an annular wall on an outer side of said rim portion of each flywheel half, an annular lip on an inner side of said rim portion of one of said halves, and an annular groove on an inner side of said rim portion of said other flywheel half; said outer walls covering one another and said annular lip being received in said annular groove when said two halves are brought together to make said cavity water tight.

2. The flywheel of claim 1 further including a second annular lip extending radially from the periphery of each said flywheel half; .

said second lips defining second oppositely disposed, inwardly opening annular grooves when said halves are connected;

and a band, edges of which are received in said second grooves around a periphery of said flywheel.

* * * * *